UNITED STATES PATENT OFFICE.

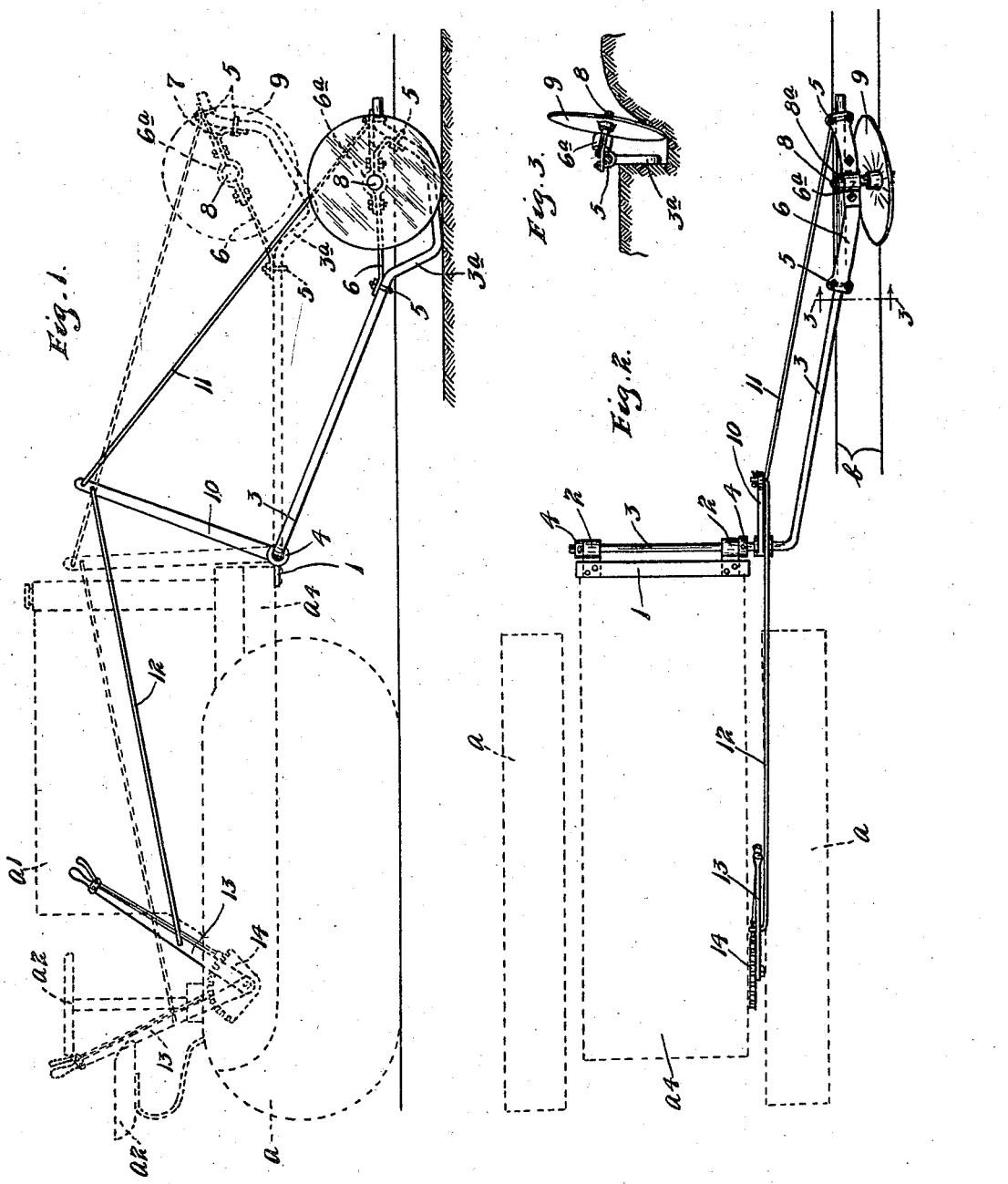

FRED J. ANDERSON, OF TRIUMPH, MINNESOTA.

TRACTOR GUIDE.

1,419,909.

Specification of Letters Patent.　Patented June 20, 1922.

Application filed June 2, 1921.　Serial No. 474,394.

*To all whom it may concern:*

Be it known that I, FRED J. ANDERSON, a citizen of the United States, residing at Triumph, in the county of Martin and State of Minnesota, have invented certain new and useful Improvements in Tractor Guides; and I do hereby declare the following to be a full, clear, and exact description of the invention, such as will enable others skilled in the art to which it appertains to make and use the same.

This invention relates to a guiding device and particularly to such a device adapted to be connected to a tractor for drawing a plow, the guiding device being arranged to travel in the furrow made by the plow and to maintain the tractor in proper relation thereto.

It is an object of this invention to provide such a guiding device of extremely simple construction, which device comprises the combination of a shoe adapted to travel along and engage the side of the furrow and a rotating member adapted to travel along and engage the bottom of the furrow.

It is a further object of the invention to connect these devices to the tractor frame by a simple means, which can be easily moved when desired to raise the guiding device into an inoperative position.

These and other objects and advantages of the invention will fully appear from the following description made in connection with the accompanying drawings, in which like reference characters refer to the same parts throughout the different views, and in which Fig. 1 is a view in side elevation of the device, parts of the tractor being indicated by dotted lines;

Fig. 2 is a top plan view of the same parts; and

Fig. 3 is a section of the device and furrow taken on line 3—3 of Fig. 2.

Referring to the drawings:

A tractor of the common endless track type is shown in dotted lines and comprises the track portion $a$, the hood portion $a^1$, steering wheel $a^2$, seat $a^3$ and frame $a^4$. A bar 1 extends across the front of the frame $a^4$ and is provided with spaced bearings 2 secured thereto. A rod 3 is journaled in these bearings and held from longitudinal movement therein by collars 4 secured to said rod. The rod 3 extends beyond one of the bearings 2 for a short distance and is then bent at an angle somewhat greater than a right angle to extend forwardly and normally downwardly from the tractor frame. Adjacent its other end, the rod is bent into an open sided figure of angular U-shape or trapezoidal form to form a shoe $3^a$, the extreme end of the rod being bent to extend forwardly in a substantially horizontal plane. Secured adjacent the shoe portion $3^a$ by U-shaped clips 5 extending around the rod 3 are two flat bars 6 and 7. The bar 7 is secured near the extreme end of rod 3 and when the device is in operative position, it extends substantially horizontally across the top of the shoe portion $3^a$. This bar 7 is formed with a semicircular portion and is secured by nutted and headed bolts located at each side of said portion to the bar 6, which is formed with a similar semicircular portion, the two said portions coacted to form a bearing $6^a$. The member 6 is secured to the rod 3 adjacent the inner end of the shoe portion $3^a$ in substantially horizontal position and beyond the semicircular portion formed therein is bent downwardly and secured to the outer arm of the shoe portion $3^a$. Disposed in the bearing $6^a$ is a short shaft 8 to the end of which disposed away from the tractor is rigidly secured a disk member 9 of slightly dished shape. The other end of shaft 8 is provided with collar $8^a$ to retain the shaft in bearing $6^a$. It will be noted that when the device is in operative position as shown in full lines in Fig. 1, the shaft 8 is not exactly in a horizontal plane, but slopes downwardly somewhat at its outer end to which the disk 9 is attached, the disk thus being held with its lower edge inclined inwardly somewhat toward the shoe $3^a$.

A lever member 10 is secured to the rod 3 adjacent the outer bearing 2 and a rod 11 extends from the upper end from this lever to the outermost clip 5, being secured thereby to the end of rod 3. Another rod 12 extends from adjacent the upper end of lever 10 to a hand lever 13 which is pivoted upon the tractor frame in position to be conveniently manipulated by the operator seated in the seat $a^3$.

A lever 13 is provided with the usual rocking quadrant 14 and a latching means cooperating therewith.

In operation, the tractor will move along adjacent the furrow indicated by the lines $b$ in Fig. 2 and the shoe $3^a$ will normally travel in contact with the vertical side of said furrow. The disk 9 will travel with its lower edge disposed rather close to the bottom of the shoe 3ᵃ and as stated above will incline outwardly and upwardly. The tractor will thus be prevented from moving away from the furrow by the engagement of the shoe 3ᵃ with the side thereof and will be prevented from moving toward the furrow by the resistance of disk 9 to such a movement, said resistance being caused both by the scraping tendency which such movement would cause and by the engagement of the disk with the plowed side of the furrow. If it be not desired to use the guide device, the same can be raised to inoperative position by movement of the levers 13 and 10 as indicated by dotted lines in Fig. 1.

From the above description, it is seen that applicant has provided a simple guiding device for a tractor which can be readily made and easily applied and which will be very effective for the purpose intended. The parts of the device are all quite simple and can be made of material which is readily attainable.

It will, of course, be understood that various changes may be made in the form, details and arrangement of the device without departing from the scope of applicant's invention, which generally stated consists in the matter shown and described and set forth in the appended claims.

What is claimed is:—

1. In a tractor having a frame and bearings secured to the front thereof, a guiding device comprising a rod journaled in said bearings and extending downwardly and forwardly therefrom and formed into an open sided figure constituting a shoe adapted to engage with the side of a furrow and a rotatable disk member supported on a shaft extending downwardly and laterally from the top of said shoe and adapted to travel along the bottom of said furrow adjacent said shoe.

2. The structure set forth in claim 1, lever means disposed adjacent to the operator of the tractor for raising said rod and disk and other members into elevated position.

In testimony whereof I affix my signature in presence of two witnesses.

FRED J. ANDERSON.

Witnesses:
M. E. LEWIS,
J. H. KRUEGER.